June 1, 1948.  E. W. CLARK  2,442,586
STRAIGHT LINE RECORDING MECHANISM
Filed Sept. 28, 1946
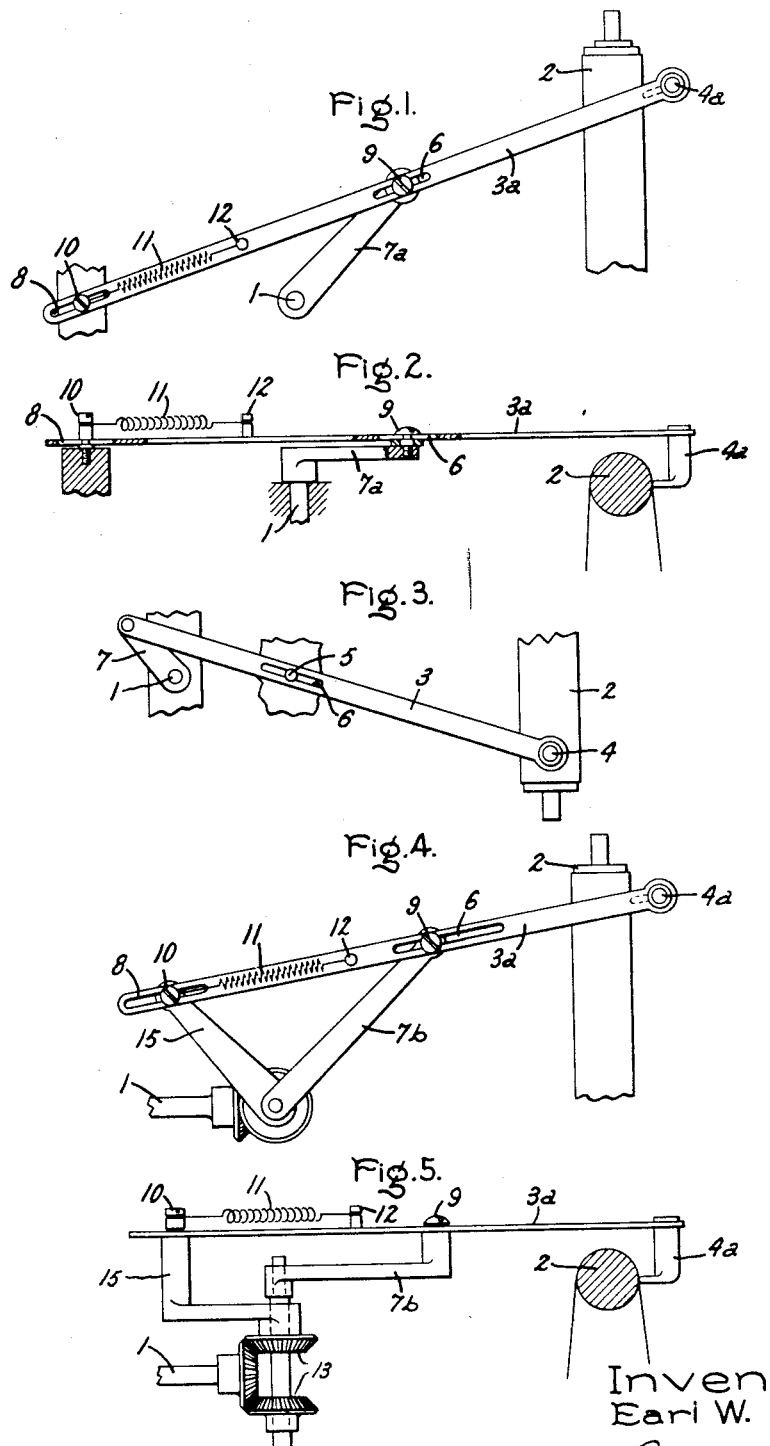
Inventor:
Earl W. Clark,
by Powell & Mack
His Attorney.

Patented June 1, 1948

2,442,586

UNITED STATES PATENT OFFICE 2,442,586

STRAIGHT-LINE RECORDING MECHANISM

Earl W. Clark, Saugus, Mass., assignor to General Electric Company, a corporation of New York Application September 28, 1946, Serial No. 699,997

2 Claims. (Cl. 346—139)

My invention relates to mechanisms for use in recording instruments for causing the stylus to trace a straight line across a recording chart when the mechanism is actuated by a rotary shaft such, for example, as the shaft of a measuring instrument. The object of my invention is to provide such straight line recording mechanism which is of simple, compact construction and wherein the straight line motion of the recording stylus is in linear relation to the angular rotation of the rotary shaft.

The features of my invention which are believed to be novel and patentable will be pointed out in the claims appended hereto. For a better understanding of my invention, reference is made in the following description to the accompanying drawing in which Figs. 1 and 2 represent plan and side views of one embodiment of my invention wherein the stylus arm is attached to a fixed pivot and to the crank arm of a rotary shaft by slot and pin couplings. Use is made of the stylus and chart platen as a straight line motion guide. Figs. 4 and 5 show plan and side views of a platen guided straight line motion recording arm actuated through two slot and pin couplings from reversely rotating crank arms of different radii, and Fig. 3 is a plan view of the simplest embodiment of my invention wherein the stylus arm is actuated by a crank arm from one end and has an intermediate slot coupling to a fixed pin.

The simplest form of the invention represented in Fig. 3 will be explained first. Here 1 may represent the rotary shaft of a measuring instrument having a limited measurement deflection through an angle of the order of 90 degrees. Two (2) represents a platen drum or roller over which a record sheet is passed, 3 the recording arm, and 4 the stylus. It is desired to record the rotary movement of shaft 1 on the record sheet as it passes over the platen 2 such that the stylus moves in a straight line axially of the roller platen represented at 2, and also so that a given lateral movement of the stylus in such straight line corresponds to a definite rotary angle of the shaft 1 at all parts of the operating range. When these objects are obtained, a recording chart with straight, uniformly spaced calibration lines may be used both as regards the quantity recorded and as regards the time of recording. The calibrating lines for the quantity recorded run parallel of the chart, and its movement and time calibrating lines run crosswise of the chart or in the same direction as the stylus 4 travels if it has straight line motion across the chart. Such a record sheet and straight line recording system require less expensive charts, produce better records, and the records obtained can be much more easily read than would be the case where these features are not present. These objects are obtained with the apparatus of Fig. 3.

It is noted that the recording arm 3 pivots about a fixed pin at 5 at an intermediate point in the arm, but that the arm may move endwise as it pivots because the pin engages in a slot 6 longitudinal of the arm 3. The end of arm 3 opposite the stylus is coupled to shaft 1 by a crank arm 7, the crank arm being fixed to shaft 1 and pivoted to the recording arm 3. The mechanism is shown at approximately one end of the recording range. From this position of the parts, arm 7 rotates counterclockwise and the stylus 4 moves up as pictured in the drawing, through the recording range, and may be assumed to correspond to a movement of arm 7 through an angle of 90 degrees. At the central point of the recording range arms 7 and 3 are parallel and at right angles to the axis of roller platen 2, so that the two halves of the recording operation are symmetrical. Shaft 1 is between the two pivot means of arm 3. In such recording movement recording arm 3 both pivots about and moves endwise on pin 5. Thus, in moving from the position shown to a central recording position, arm 3 moves endwise toward the left so that the stylus 4 instead of moving in a circle moves upward parallel with the axis of the roller 2. Also, the relative lengths of the portions of arm 3 on opposite sides of pivot 5 change. Thus, the lever arm from pivot 5 to the stylus 4 decreases, and the lever arm from the pivot 5 to the point of attachment with arm 7 increases as the latter approaches midposition. This change in lever arm ratio is in the proper direction to compensate for the increase in effectiveness of crank arm 7 in moving lever 3 about pivot 5 as it approaches midposition. Hence, the lateral movement of the stylus 4 for a given angular movement of arm 7 near the ends of the operating range tends to be the same as for the same angular movement of arm 7 near the center of the operating range.

It is thus seen that the mechanism is one which tends to produce a straight line motion of the stylus 4 across the chart as distinguished from a curved motion and tends to produce a linear relation between the angular movement of shaft 1 and the lateral movement of the stylus at all parts of the operating range, as distinguished from small displacement of the stylus near the two ends of the operating range and large displacement over the center of the operating range for the same angular movement of shaft 1. By properly proportioning the mechanism, the ideal relations can be approached very closely, and for this purpose the following relations have been found satisfactory:

| | |
|---|---|
| Measurement angle of chart 1 to be recorded _____ degrees__ | 90 |
| Recording width of chart_____ inches__ | 3¾ |
| Length of arm 3_____ do____ | 9.935 |
| Length of arm 7_____ do____ | 1.56 |
| Distance between axes of shaft 1 and pivot 5 _____ inches__ | 2.407 |

With these relations the stylus 4 will travel over the recording range with less than 0.001 inch deviation from a straight line, and the deviation from a linear relation between angular motion of shaft 1 and lateral motion of the stylus 4 is less than ³⁄₁₀ of one per cent. These variations from the ideal are so small that they can be ignored entirely, as they will not be noticeable from the record produced and are less than metering errors that are generally present. It is noted also that there is considerable mechanical amplification as crank arm 7 is much shorter than the recording arm 3 and its pivot end moves over appreciably less distance than the stylus 4.

In the form of the invention shown in Figs. 1 and 2, a modified form of stylus 4a is used and bears against the chart on the front side or in the longitudinal direction of the recording arm instead of on the top of the platen roller 2. Here the platen serves as a straight line guide for the stylus, as it has a recording surface in a plane at substantially right angles to the plane of rotation of the recording arm. The recording arm 3a has slots 6 and 8 near its center and at its rear end. The recording arm 3a is moved by a crank arm 7a fixed to a measuring instrument shaft 1 and having a pin 9 engaging in the slot 6. The recording arm 3a pivots about a fixed pin 10 engaging in the end slot 8. A light spring 11 is tensioned between fixed pin 10 and a point 12 on the recording arm 3a which serves to bias or urge the recording arm 3a lengthwise to the left, keeping the stylus 4a bearing against the chart on roller platen 2. The crank arm 7a is shown near the limit of its recording movement in a counterclockwise direction and will rotate clockwise in moving the stylus 4a downward as shown in Fig. 1. A range of movement of 90 degrees is contemplated for shaft 1.

It will be evident that as shaft 1 rotates clockwise in Fig. 1, arm 3a will be swung down about the pivot at 10 and will also move lengthwise to the left due to the action of spring 11, keeping the stylus 4a against the chart on the front surface of platen 2. This action continues until mid-recording position is reached, which is when arm 7b is parallel with the recording arm 3a. In such operation it is evident that the stylus 4a has a straight line motion across the chart because guided by the straight line front of the roller platen 2. It is also evident that the length of arm 3a between stylus 4a and pivot pin 10 decreases at a slower rate than the length of such arm between stylus 4a and crank pin 9 because pin 10 is stationary and pin 9 moves toward the platen 2 in moving toward midposition. Hence, the action is such as to contribute toward a linear relation between the angular rotation of shaft 1 and the motion of the stylus 4a across the chart. The relation between the distance Y of the stylus from midposition and the angular position X of shaft 1 from midposition in terms of dimensions of the parts may be expressed as follows:

$$Y = \frac{(OD+OA)R \sin X}{OA + R \cos X}$$

where
OD = distance of shaft 1 from contact point of stylus when in midposition,
OA = distance between shaft 1 and pin 10, and
R = radius of crank arm 7a.

Practical dimensions are as follows for a 10-inch chart and a range of deflection of shaft 1 over 90 degrees:

| | |
|---|---|
| Radius R of arm 7a _____ inches__ | 3.625 |
| Distance OD _____ do__ | 8.25 |
| Distance OA _____ do__ | 5.00 |

With these values the deviation from a linear relation between angular movement of shaft 1 and the straight line distance traveled by the stylus is never greater than one-half of one per cent of the chart width.

Still more accurate results using practicable dimensions can be obtained with the arrangement of Figs. 4 and 5. In the latter figures the recording arm 7b, stylus 4a, and platen 2 are similar to those employed in Figs. 1 and 2 with the possible exception of dimensions. Between the recording arm 3a and instrument shaft 1 are a differential 13 and a pair of crank arms 7b and 15. Shaft 1 in rotating rotates the two sides of the differential at the same rate but in opposite directions, and the crank arms 7b and 15 therefore rotate in opposite directions. The longer crank arm 7b has a slot and pin connection with the midportion of arm 3a, and the shorter crank arm 15 has a slot and pin connection with the back end portion of the arm 3a. The spring 11 holds the stylus 4a against the front side of the straight line guide platen 2 or against the chart thereon as in Figs. 1 and 2, and this determines the linear position of the recording arm. In mid-recording position the crank arms 7b and 15 are parallel with the recording arm 3a and at right angles to the axis of roller platen 2. The operation is symmetrical at opposite sides of center recording position. A 90-degree rotation of the crank arms over the recording range is contemplated and is shown in Fig. 4 near one end of the recording range. In moving to the central position from that represented in Fig. 4, the pen arm moves endwise to the left, it moves bodily downward as a whole and it has a pivoting movement about moving pivot pin 10 in the end of arm 15.

The distance Y of travel of the stylus from midposition in terms of angular rotation X of shaft 1 from midposition and dimensions of the parts may be expressed mathematically as follows:

$$Y = r \sin X + \frac{[(R-r) \sin X][OD + r \cos X]}{(R+r) \cos X}$$

where

R and r represent the radii of arms 7b and 15, respectively, and
OD represents the distance of the pivot point of arms 7b and 15 from the contact point of the stylus when in midposition.

Practical dimensions for a 9-inch chart and 90-degree deflection of the crank arms 7b and 15 are as follows:

Radius R of arm 7b_____inches__ 5.203
Radius r of arm 15_____do____ 3.672
Distance OD_____do____ 8.375

Deviation from uniformity between rotation of shaft 1 and straight line motion travel distance of stylus 4a is less than 1/10 of one per cent of the chart width.

In the examples given, dimensions, deflection angles, and chart widths have been mentioned which show that the apparatus may be confined to a reasonable amount of space, produces appreciable mechanical amplification, and may be applied to conditions most likely to be encountered in practice. The invention is not limited in these respects. Also, the examples have been confined to obtaining a linear relation between angular deflection of the measurement shaft and distance traveled by the stylus. In some cases it may be desirable to expand certain parts of the record in relation to other parts, and where the apparatus described is adapted for that purpose it may be so used. As an example, if in Figs. 4 and 5, I move the point about which crank arms 7b and 15 move away from the platen 2 and lengthen arm 3a accordingly from slot 6 to the stylus, I can obtain an expansion of the recording scale at the extremities of the recording range as compared to the central portion of the range. I can also use only one-half of the recording range described as from the midposition to one extremity in order that high values of the measurement recorded will be expanded as compared to low values. The gear ratio between shaft 1 and the crank arm sides of the differential in Fig. 5 does not necessarily need to be a 1-to-1 ratio. Hence, I may use a 90-degree deflection of shaft 1 and one-half the recording range described, or a 45-degree deflection of shaft 1 and the complete recording range described.

In the claims wherein I state that the recording stylus moves in a straight line or the equivalent and that the angular motion of the shaft and the straight line motion of the stylus have a linear relation, I mean to include operations such as have been described herein where the departures from perfection in these respects are of such small order that they may be ignored for all practical purposes.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a recording apparatus, a shaft having a range of rotary movement through an angle of the order of 90 degrees, a recording arm, a stylus at one end of such arm, said recording arm having longitudinal slots at the other end and at an intermediate portion thereof, a crank arm secured to said shaft and carrying a pivot engaging in the slot in the intermediate portion of said recording arm, a pivot engaging in the other slot of said recording arm such that as the crank arm rotates the recording arm may pivot about and move endwise on both pivots, a straight line guiding surface at substantially right angles to the plane of movement of the recording arm, and a spring connected between said recording arm and one of said pivots for urging the recording arm endwise toward said straight line guiding surface whereby such surface serves to guide the stylus in a straight line when moved in response to the operation of said crank arm.

2. Recording apparatus comprising a rotary shaft, a recording arm, a stylus carried at one end of said arm with its marking point extending in the longitudinal direction of said recording arm, a stationary support, a pin and slot connection between the other end of said recording arm and support, a crank arm secured to said shaft, a pin and slot connection between said crank arm and an intermediate portion of said recording arm, said pin and slot connection permitting the recording arm to pivot at and move endwise at both connections, said crank arm causing the recording arm to swing in a given plane and to move the stylus in response to the rotary movements of said shaft, a straight line guiding surface at substantially right angles to the plane of movement of said recording arm, and means for urging said recording arm endwise toward said straight line guiding surface whereby, as the recording arm swings, said surface guides the stylus in a straight line, the dimensions of said parts and spacing of the pivots and shaft being such that the angular movement of said shaft and the straight line movement of said stylus have a linear relation over the recording range of such apparatus.

EARL W. CLARK.

REFERENCES CITED

The following references are of record in the file of this patent:

UNITED STATES PATENTS

| Number | Name | Date |
| --- | --- | --- |
| 407,461 | Anderson | July 23, 1889 |
| 631,540 | Henning | Aug. 22, 1899 |
| 1,039,891 | Buchanan | Oct. 1, 1912 |
| 2,392,487 | Lee | Jan. 8, 1946 |

FOREIGN PATENTS

| Number | Country | Date |
| --- | --- | --- |
| 357,187 | Great Britain | Sept. 18, 1931 |
| 548,159 | France | Oct. 13, 1922 |
| 554,340 | Germany | July 20, 1932 |